US012611717B2

(12) United States Patent
Albert et al.

(10) Patent No.: US 12,611,717 B2
(45) Date of Patent: Apr. 28, 2026

(54) METHOD FOR PRODUCING A SUPPORT STRUCTURE IN ADDITIVE MANUFACTURING

(71) Applicant: Siemens Energy Global GmbH & Co. KG, Bayern (DE)

(72) Inventors: Johannes Albert, Berlin (DE); Ole Geisen, Berlin (DE); Timo Heitmann, Berlin (DE); Lisa Kersting, Berlin (DE); Vinzenz Müller, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 888 days.

(21) Appl. No.: 17/793,389

(22) PCT Filed: Jan. 25, 2021

(86) PCT No.: PCT/EP2021/051608
§ 371 (c)(1),
(2) Date: Jul. 16, 2022

(87) PCT Pub. No.: WO2021/156087
PCT Pub. Date: Aug. 12, 2021

(65) Prior Publication Data
US 2023/0056383 A1      Feb. 23, 2023

(30) Foreign Application Priority Data

Feb. 6, 2020      (DE) ..................... 10 2020 201 450.7

(51) Int. Cl.
*B22F 10/47* (2021.01)
*B22F 10/28* (2021.01)
(Continued)

(52) U.S. Cl.
CPC .............. *B22F 10/47* (2021.01); *B22F 10/28* (2021.01); *B22F 10/366* (2021.01); *B22F 10/40* (2021.01);
(Continued)

(58) Field of Classification Search
CPC ......... B22F 10/28; B22F 10/40; B22F 10/366
See application file for complete search history.

(56) References Cited

U.S. PATENT DOCUMENTS

2015/0079306 A1    3/2015  Schoeneborn
2016/0167303 A1    6/2016  Petelet
(Continued)

FOREIGN PATENT DOCUMENTS

CN        107107469 A      8/2017
CN        110191868 A      8/2019
(Continued)

OTHER PUBLICATIONS

DE102016224060A1 English language translation (Year: 2018).*
(Continued)

*Primary Examiner* — Sally A Merkling
*Assistant Examiner* — Sean P. O'Keefe
(74) *Attorney, Agent, or Firm* — Wolter Van Dyke Davis, PLLC

(57)      ABSTRACT

A method for producing a support structure in the additive manufacturing of a component, includes: a) providing a geometry for the component having a region to be supported, b) providing a support structure for the region of the component, c) defining an irradiation pattern for an irradiation of layers of a raw material for the support structure, wherein surface vectors for an irradiation for a structure of the component extend into a region of the support structure, wherein common surface vectors are defined for the component and for the support structure, and d) selective irra-
(Continued)

diation of layers of the raw material for the component and the provided support structure according to the defined irradiation pattern.

15 Claims, 2 Drawing Sheets

(51) Int. Cl.

| | |
|---|---|
| *B22F 10/366* | (2021.01) |
| *B22F 10/38* | (2021.01) |
| *B22F 10/40* | (2021.01) |
| *B22F 10/85* | (2021.01) |
| *B33Y 10/00* | (2015.01) |
| *B33Y 30/00* | (2015.01) |
| *B33Y 50/02* | (2015.01) |

(52) U.S. Cl.
CPC .............. *B22F 10/85* (2021.01); *B33Y 10/00* (2014.12); *B33Y 30/00* (2014.12); *B33Y 50/02* (2014.12); *B22F 10/385* (2021.01)

(56) References Cited

U.S. PATENT DOCUMENTS

| | | | |
|---|---|---|---|
| 2017/0057014 A1 | 3/2017 | Illston et al. | |
| 2018/0200945 A1 | 7/2018 | Ochi | |
| 2019/0389137 A1 | 12/2019 | Frohnmaier | |
| 2020/0269352 A1* | 8/2020 | Maurer | B23K 26/082 |
| 2021/0178480 A1* | 6/2021 | Mamrak | B33Y 50/02 |

FOREIGN PATENT DOCUMENTS

| | | | |
|---|---|---|---|
| CN | 110475633 | A | 11/2019 |
| DE | 102013218760 | A1 | 3/2015 |
| DE | 102016115674 | A1 | 3/2017 |
| DE | 102016224060 | A1 | 6/2018 |
| EP | 2601006 | B1 | 6/2014 |
| EP | 3127635 | A1 | 2/2017 |
| EP | 3425461 | A1 | 1/2019 |
| EP | 3459654 | A1 | 3/2019 |
| WO | 2019096690 | A1 | 5/2019 |
| WO | 2019179690 | A1 | 9/2019 |

OTHER PUBLICATIONS

Jingchao, Jiang et al; "Support Structures for Additive Manufacturing: a Review"; in Journal of Manufacturing and Materials Processing; 2018.

Morgan, Dakota et. al.; "Support Structure Development and Initial Results for Mental Powder Bed Fusion Additive Manufacturing"; Procedia Manufacturing; vol. 10; Jun. 7, 2017; pp. 819-830; XP055574221; 43rd North American Manufacturing Research Conference; ISSN: 2351-9789.

PCT International Search Report and Written Opinion of International Searching Authority mailed May 19, 2021 corresponding to PCT International Application No. PCT/EP2021/051608 filed Jan. 25, 2021.

Yan, Liqiang et al., Automatic Generation Technology of Thin-Walled Support Based on Separate Area in Selective Laser Melting; Aeronautical Manufacturing Technology, No. 21; 2019; pp. 91-97 [English abstract on p. 1].

\* cited by examiner

METHOD FOR PRODUCING A SUPPORT STRUCTURE IN ADDITIVE MANUFACTURING

CROSS REFERENCE TO RELATED APPLICATIONS

This application is the US National Stage of International Application No. PCT/EP2021/051608 filed 25 Jan. 2021, and claims the benefit thereof. The International Application claims the benefit of German Application No. DE 10 2020 201 450.7 filed 6 Feb. 2020. All of the applications are incorporated by reference herein in their entirety.

FIELD OF INVENTION

The present invention relates to a method for manufacturing a support structure in the additive manufacturing of a component or to a novel irradiation strategy for the support structure. Furthermore, a corresponding computer program product, an apparatus and a controller are specified.

The component is advantageously intended for use in a turbomachine, advantageously in the hot gas path of a stationary gas turbine for energy generation. The component advantageously consists of a superalloy, in particular a nickel- or cobalt-based superalloy.

BACKGROUND OF INVENTION

In gas turbines, thermal energy and/or flow energy of a hot gas generated by combustion of a fuel, e.g. a gas, is converted into kinetic energy (rotational energy) of a rotor.

For this purpose, a flow channel is formed in the gas turbine, the rotor or a shaft being mounted in the axial flow direction of said flow channel. If a hot gas flows through the flow channel, the moving blades are subjected to a force, which is converted into a torque which acts on the shaft and drives the turbine rotor, the rotational energy being able to be used e.g. for operating a generator.

Modern gas turbines are continually undergoing improvement to increase their efficiency. However, one of the effects of this is ever higher temperatures in the hot gas path. The metallic materials for moving blades, in particular in the first stages, are continually being improved with respect to their strength at high temperatures, creep loading and thermomechanical fatigue.

Alternatively, the component may be some other component, such as, for example, a high-performance component for applications in aeronautics or in the automotive sector.

On account of its disruptive potential for industry, generative or additive manufacturing is also becoming increasingly of interest for the series manufacture of the components described.

Additive manufacturing methods comprise for example, as powder bed methods, selective laser melting (SLM) or selective laser sintering (SLS), or electron beam melting (EBM). Further additive methods are for example "directed energy deposition (DED)" methods, in particular laser deposition welding, electron beam or plasma powder welding, wire welding, metal powder injection molding, so-called "sheet lamination" methods, or thermal spraying methods (VPS, LPPS, GDCS).

A method for selective laser melting is known for example from EP 2 601 006 B 1.

Additive manufacturing methods have furthermore proved to be particularly advantageous for components that are complex or of a filigree design, for example labyrinthine structures, cooling structures and/or lightweight structures. In particular, additive manufacturing is advantageous as a result of a particularly short chain of process steps, since a step for the manufacture or production of a component can be performed largely on the basis of a corresponding CAD file ("Computer-Aided Design") and optionally the choice of corresponding production parameters.

A computer program product—as described in the present case—may for example be provided or included as a (volatile or nonvolatile) storage medium, such as e.g. a memory card, a USB stick, a CD-ROM or DVD, or else in the form of a downloadable file from a server and/or in a network. It may furthermore be provided for example in a wireless communication network by the transmission of a corresponding file with the computer program product. A computer program product may include program code, machine code or numeric control instructions such as G-code and/or other executable program instructions in general.

The application of novel additive manufacturing technology such as, for example, selective laser melting or "laser powder bed fusion" requires in some instances the use of so-called support structures in conjunction with advantageously high freedom in the design of the achievable components. Said support structures become necessary as soon as a region to be supported or a critical overhang angle of a section of the component of, for example, 40° with respect to the surface of a build platform is undershot. Furthermore, support structures may also be necessary for mechanically supporting or fixing a component in the construction space during the construction process, in order not only to realize a specific construction result but also to prevent the mechanical detachment ("tearing away") of the component from the build platform. This can occur particularly in the case of large components and strong mechanical or thermomechanical stresses of the built-up structure. Such stresses furthermore occur primarily in a vertical direction, i.e. along a build-up direction of the structure.

The occurrence of strong (thermal) stresses can lead in particular to mechanical warpage of the component or the built-up structure thereof, which—in the extreme case—can lead to the termination of the manufacturing process, particularly if a region of the component that is bending up or has been torn away collides with a coating device for distributing a new powder layer. If for example—on the basis of calculations and/or a simulation—it can be assumed that such strong stresses or deformations resulting in tearing away or termination of the manufacturing method will occur, so-called "volume supports" or volume support structures may be used. What may nevertheless be problematic here is that even such fixed, rigid support structures cannot reliably bring about a sufficient linking of the component geometry to the build platform. This is owing to conventional irradiation techniques which normally have to be chosen for the component and corresponding support structures. In particular, these irradiation strategies and the locally introduced heat or corresponding cooling rates associated therewith are disadvantageous for the structure result of the component and cause thermal and/or thermomechanical stresses.

SUMMARY OF INVENTION

It is therefore an object of the present invention to specify means that can be used to achieve an improved irradiation, in particular for the support structures mentioned, or improved thermal management. This object is achieved by the subject matter of the independent patent claims. The dependent patent claims relate to advantageous embodiments.

One aspect of the present invention relates to a method for manufacturing a support structure in the additive, in particular layer-by-layer, manufacturing of a component, for example in a powder-bed-based manner by selective laser melting or electron beam melting.

The method comprises providing a geometry for the component having a region to be supported, for example an overhang. The geometry is usually provided by way of a CAD file (digitally).

The method furthermore comprises providing a support structure for the region to be supported of the component, in particular for the mechanical support thereof. Besides the mechanically supporting effect, support structures that support at least one overhang also have the effect that heat dissipation can occur significantly more efficiently or—in contrast to loose powder situated under an overhanging structure region—can actually occur in the first place.

In one embodiment, the component geometry has overhangs.

The method furthermore comprises defining an irradiation pattern for an irradiation of layers of a raw material, in particular powder, for the support structure and/or the component, wherein area or area irradiation vectors or hatching vectors for an irradiation of layers for a structure of or for the component extend in a region of the support structure or are lengthened into said region.

The process of defining the irradiation pattern as described in the present case can be effected for example by way of CAM means ("computer aided manufacturing").

The region of the support structure, as mentioned above, advantageously constitutes a lateral region or area region of the support structure, in particular layer-by-layer next to the actual component contour.

The aforementioned area irradiation vectors advantageously describe irradiation trajectories for inner regions of a layer to be irradiated. By contrast, so-called contour irradiation vectors are usually required for the additive component manufacturing in the context described, in particular in order to realize a contour of the component with the required structural or surface quality.

The method furthermore comprises selectively irradiating layers of the raw material for the component and the provided support structure in accordance with the defined irradiation pattern. Said irradiating is expediently effected in a powder-bed-based manner by way of SLM or EBM using a laser beam or electron beam and corresponding control and/or optics.

Advantageously, what can be achieved by the area vectors extending into the region of the support structure in the manner described is that a temporal offset of the irradiation of the component region, on the one hand, and the region of the support structure, on the other hand, can be minimized. This advantageously brings about an improved structural linking between the two regions and the reduction of thermal stresses and/or structure defects which may arise as a result of an excessively high or excessively low energy input and/or large inherent temperature gradients.

Such an irradiation strategy for the area irradiation of individual layers in additive manufacturing is not reproducible by conventional means since, when selecting an irradiation strategy for a support structure, for example, it is not possible to intervene in a corresponding irradiation for the component and vice versa. The present invention advantageously affords the possibility that the component and a corresponding volume support can be output and/or irradiated as one and the same component during the definition of the required hatching vectors.

In one embodiment, the additive manufacturing method is a powder-bed-based method, for example selective laser melting or electron beam melting.

In one embodiment, the region to be supported or a tangent or surface tangent to this region forms an angle of less than 40° with respect to a build platform or the surface thereof. In accordance with this embodiment, the region to be supported constitutes a (comparatively greatly) overhanging region of the component which has to be supported mechanically and/or thermally for example during the additive manufacturing. Furthermore, this described geometry is a region which is particularly suitable as a starting point for the support structure as volume support. If the "support" or the support structure commences here, particularly expediently and advantageously a stabilization of the entire built-up structure of the component can be achieved and/or a tearing away of the structure from the build platform on account of a particularly strong stress state can be prevented.

In one embodiment, the support structure—as indicated above—constitutes a volume support.

In one embodiment, the volume support and respectively the support structure are embodied in a manner free of lattices or lattice work and/or in a manner free of toothings. This embodiment enables a particularly robust and fixed support of the region to be supported. Preferably, the support structure in accordance with this embodiment is furthermore formed from solid material, which may have only slight porosity.

In one embodiment, common hatching vectors are defined for the component and for the support structure. However, a strategy for irradiating the contour of the component advantageously differs from the exposure of the support structure.

In one embodiment, the irradiation for the layers of the support structure is carried out in a manner free of contour vectors. This embodiment advantageously makes it possible to carry out the process in a temporally efficient manner and to dispense with a complex contour exposure during the manufacture of the "support". It is evident that particularly in the industrialization of additive manufacturing methods for the components described above, the required process time for building up said components represents a significant restriction since building up large components by an additive route may occupy a number of days through to weeks. Although irradiation speeds can be continually optimized or adapted, building up many thousands through to tens of thousands of layers, for example a layer thickness of 20 μm to 40 μm, requires many millions of individual radiation paths or vectors for a corresponding structure.

In one embodiment, a volume of the component in accordance with the provided geometry includes at least 20% of the construction space of a corresponding manufacturing installation or apparatus. In accordance with this embodiment, the component constitutes a comparatively large-volume component which, in particular during manufacturing, tends toward becoming detached from a build platform at least in sections on account of thermomechanical stress.

In one embodiment, the support structure is manufactured in such a way that one or more layers in a layer sequence of the additive construction are omitted. By way of example, one, two, three, four, five, ten or fifty layers can be correspondingly omitted. This implementation can furthermore be advantageous in order to carry out the construction of the support structure temporally more efficiently and, at the same time, to attain a sufficient stability or support effect. Particularly if further irradiation parameters, such as a laser power, are then adapted, in particular increased, it is possible to attain a more efficient construction of the support structures, the mechanical stability of which is then scarcely impaired by comparison with a regular irradiation of each individual layer.

In one embodiment, the support structure—in contrast to the structure of the component—is irradiated with altered irradiation parameters, such as, for example, an irradiation power or irradiation speed.

In one embodiment, the layers for the support structure are irradiated with an increased irradiation speed. This advantageously likewise allows a more time-efficient additive build-up process.

In one embodiment, the layers for the support structure are irradiated with an adapted irradiation power, advantageously an increased irradiation power in association with the above-described embodiment in which an irradiation of individual layers is omitted.

A further aspect of the present invention relates to a computer program or computer program product, comprising instructions which, when a corresponding program is executed by a computer, cause the latter to carry out at least the described steps of providing, providing the support structure and defining the irradiation pattern.

A further aspect of the present invention relates to an apparatus, comprising at least one irradiation device, which is configured to irradiate layers for the component and the support structure in accordance with the defined irradiation pattern.

A further aspect of the present invention relates to a controller configured to control an irradiation device for selectively irradiating layers of the raw material in accordance with the defined irradiation pattern.

Embodiments, features and/or advantages which relate here to the method and/or the computer program may furthermore pertain to the apparatus or the controller, or vice versa.

The expression "and/or" used here, when it is employed in a series of two or more elements, means that each of the elements mentioned can be used by itself, or any combination of two or more of the elements mentioned can be used.

BRIEF DESCRIPTION OF THE DRAWINGS

Further details of the invention are described below with reference to the figures.

DETAILED DESCRIPTION OF INVENTION

In the exemplary embodiments and figures, identical or identically acting elements may each be provided with the same reference signs. The illustrated elements and their size relationships among one another should not be regarded as true to scale, in principle; rather, individual elements may be illustrated with exaggerated thickness or size dimensions in order to enable better illustration and/or in order to afford a better understanding.

Figure 1:
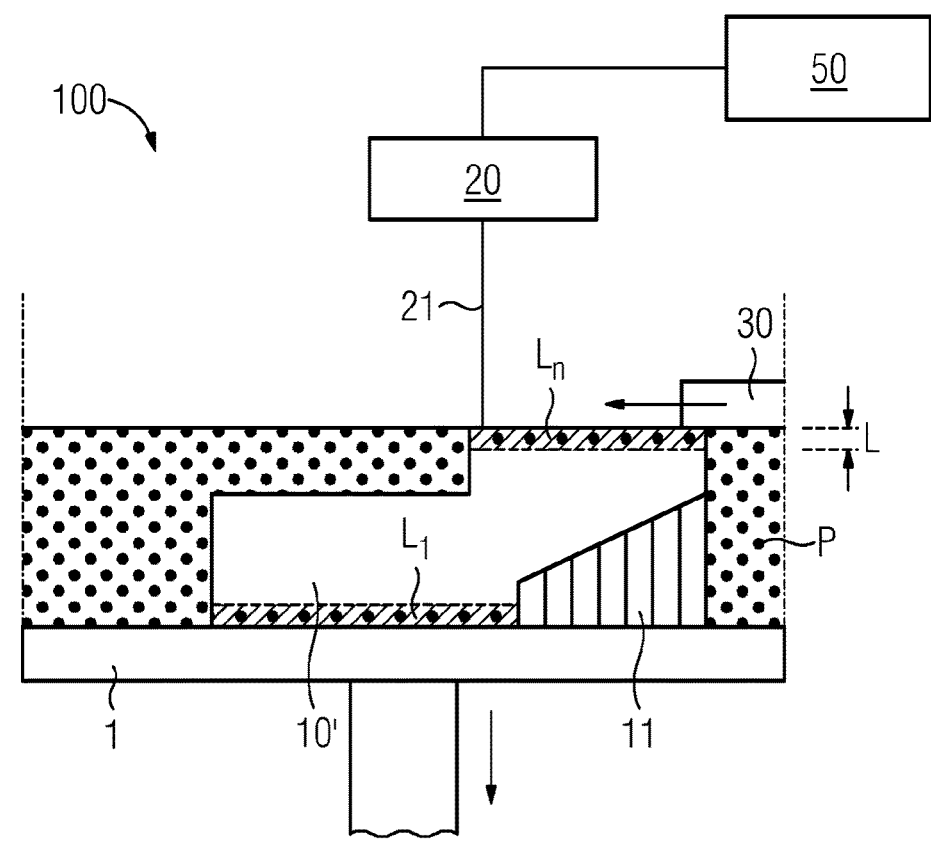
FIG. 1 shows a schematic sectional or side view of a component during the additive manufacturing thereof from a powder bed.

FIG. 1 shows an additive manufacturing installation or manufacturing apparatus 100. The manufacturing apparatus 100 is advantageously configured as an LPBF installation and for the additive manufacturing of components from a powder bed. The installation 100 may especially also be an installation for electron beam melting. Accordingly, the apparatus comprises a build platform 1. On the build platform 1, a component 10' to be additively manufactured is manufactured layer by layer from a powder bed. The latter is formed by a powder P, which can be distributed layer by layer on the build platform 1 by means of a coating device 30.

After the application of each powder layer Ln (cf. layer thickness L), in accordance with the predefined geometry of the component 10' regions of the corresponding layer are selectively melted by an energy beam 21, for example a laser or electron beam, from an irradiation device 20 and/or a corresponding controller (cf. reference sign 50), and are subsequently solidified.

After each layer L, the build platform 1 is advantageously lowered by an amount corresponding to the layer thickness L (cf. arrow directed downward in FIG. 1). The layer thickness L is usually only between 20 μm and 40 μm, and so the overall process may easily require irradiation of a number of from one thousand to tens of thousands of layers.

In this case, high temperature gradients, for example of $10^6$ K/s or more, may occur as a result of the only very locally acting energy input. It goes without saying that a stress state of the component 10' is also correspondingly high during the build-up and thereafter, which makes the additive manufacturing processes and/or corresponding post-processing considerably more complicated.

The geometry of the component is usually provided by a CAD file (cf. FIG. 4 further below).

After such a file has been read into the installation 100, the process usually requires firstly the definition of a suitable irradiation strategy for example by CAM (computer-aided manufacturing") means, as a result of which the component geometry is normally also divided into the individual layers Ln.

The manufacturing complexity of the component is usually not always the same in this case. FIG. 1 illustrates a support structure 11', for example, which has to support an overhanging region of the component both mechanically and thermally. Such overhanging regions are critical in particular since there a melt pool (not explicitly marked) dimensioned in a manner usually extending over a plurality of, for example 5, layer thicknesses extends downward into a loose powder region.

Figure 2:
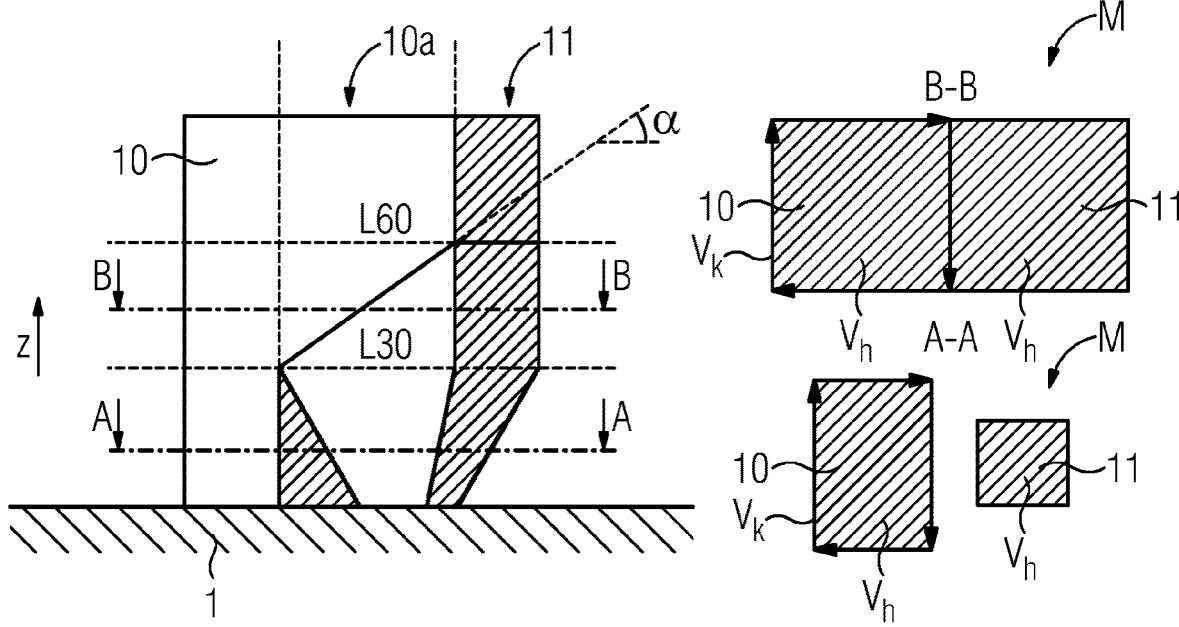
FIG. 2 shows, in the left-hand part of the illustration, a schematic sectional or side view of a geometry of a component to be additively manufactured. In the right-hand part, irradiation patterns for the manufacture of the component and/or of a support structure are indicated in a manner associated with indicated cross sections of the additive build-up.

FIG. 2 shows, in the left-hand part of the illustration, parts of a component 10 to be additively manufactured, which component is built up and respectively provided with a support structure by means appertaining to the present invention. In other words, a corresponding irradiation of a support structure for the component is effected by way of the present invention.

The component 10 has a region 10a to be supported. The region 10a can be—as illustrated—a region partly overhanging the build platform 1. In contrast to the illustration, however, said region can also be a region having a vertical or only weakly overhanging wall (so-called "inskin"

region), this region requiring an intensified mechanical support during build-up in order for example to avoid a "tearing away" of the component from the build platform 1.

Preventing such tearing away is conventionally done by a so-called beam offset usually being adapted or enlarged in preparation for the process. As a result, a volume of the support structure can likewise be enlarged and a greater overlap and fusion between layers of a support structure and the actual component occur, under certain circumstances. However, this measure has the disadvantage, inter alia, that the area to be exposed is additionally enlarged and, consequently, more material or volume is required, and the construction or process time is lengthened.

As an alternative thereto, it would be possible just to dispense with the "reproduction" of the region to be supported, and to build up solid material in the entire volume under the overhang. As a result, a very good mechanical linking is achieved; however, this strategy has the effect that process parameters adapted for a process efficiency cannot be applied to support structures.

The component 10 advantageously constitutes a component shaped in a complicated way and composed of high-performance materials, for example a component which is subjected to high thermal loading and for example is also used in the automotive sector or in the field of aeronautics.

Particularly advantageously, the component 10 is a component of the hot gas path of a turbo machine, such as a stationary gas turbine, for example. In this sense, the component may denote a rotor blade or guide vane, a ring segment, a burner part or a burner tip, a shroud, a screen, a heat shield, a nozzle, a seal, a filter, an orifice or lance, a resonator, a piston or a swirler, or a corresponding transition, insert, or a corresponding retrofit part.

The volume of the described component 10 can for example furthermore occupy at least 10%, 20%, 30% or 40% of the construction space of a corresponding manufacturing apparatus 100.

FIG. 2 furthermore depicts an overhang angle α, which is advantageously less than 50°, particularly advantageously less than 40°, relative to a surface of the build platform 1 or a horizontal. The advantages according to the invention are particularly clear in this angular range. However, the proposed irradiation strategy for the regions to be supported also has an advantageous effect even in the case of larger angles than that mentioned or structures overhanging to a lesser extent.

In the present case, therefore, the region 10a to be supported is provided with a support structure 11. The support structure is advantageously a so-called "volume support", in particular without cavities, lattice structures or toothings.

It is discernible on the left in FIG. 2 that directly at the transition into the build platform 1 the support structure 11 is not structurally connected to the component 10. With progressive build-up of structure along the vertical build-up direction z, the structures of component 10 and support structure 11 in the example shown converge up to a point along the direction z at which they join together (cf. dashed horizontal line). Starting from this point, in the present case the overhang of the component also extends in accordance with its predefined geometry.

The dashed line indicating the aforementioned point corresponds here to the thirtieth constructed layer L30, for example. In the example described, the overhang of the region 11 to be supported continues to extend up to a layer L60 corresponding to the sixtieth constructed layer, for example.

A plan view of a layer plane of the built-up structures in accordance with the section A-A in the left-hand illustration is shown at the bottom right in FIG. 2. Since the structure of the component in accordance with a predefined geometry is not yet cohesively connected to the support structure at this point in time, two separate layer cross sections or plan views thereof are indicated. Even if the right-hand part of the illustration is merely a schematic indication of a geometry and a corresponding irradiation pattern therefor, the correspondingly shown layers are designated by the reference sign "10" for the component and "11" for the support structure for the sake of simplicity.

Hatching vectors or area irradiation vectors Vh, for an irradiation or build-up result covering as much area as possible, are indicated on the left in the layer plan view. Contour irradiation vectors Vk are depicted at a contour of the layer or in a manner enclosing the hatching vectors Vh. By way of a corresponding contour irradiation—usually also downstream of the area irradiation—an edge region of the built-up component structure is intended to be improved with regard to its structure and surface.

A plan view of a layer plane of the built-up structures in accordance with the section B-B in the left-hand illustration is shown at the top right in FIG. 2. This illustration corresponds to an irradiation variant according to the invention in accordance with which advantageously the support structure 11 can be built up in the present case. It is evident (also cf. FIG. 4 further below) that the area irradiation vectors for the structure of the component or a corresponding irradiation pattern M would be defined in such a way that they extend into a region of the support structure (towards the right) or were lengthened into said region or form common area irradiation patterns. The technical advantages according to the invention as described in the present case can be achieved as a result.

In particular, the support structure 11 at the top right in the illustration in FIG. 2 is indeed advantageously irradiated in the area in the same process step with the correspondingly adjacent layer for the component. However, the irradiation of the support structure is advantageously effected without any contour vectors. Therefore, contour irradiation vectors Vk are also only depicted in the left-hand portion of the plan view shown.

Figure 3:
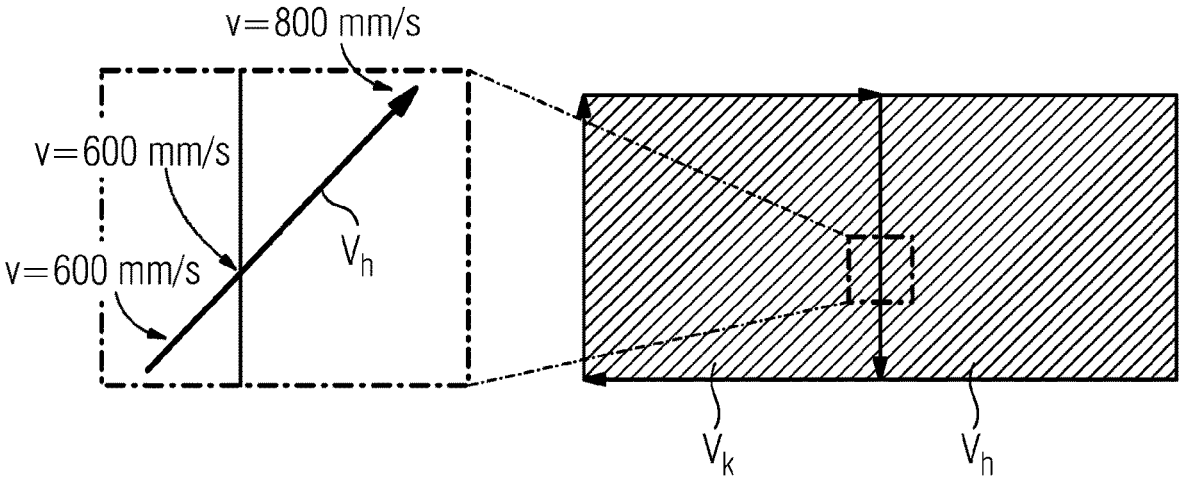
FIG. 3 schematically indicates one exemplary embodiment of an irradiation strategy for the component and the support structure.

FIG. 3 shows, in the left-hand part of the illustration, a schematic plan view of a layer to be irradiated, or a digital model thereof, which partly includes a component region (on the left) and also a region of the support structure 11 (on the right). In particular, a single area irradiation vector is indicated as a diagonal arrow. Furthermore, a transition between the component 10 and the support structure 11 is indicated by a vertical line.

FIG. 3 illustrates in particular that the present invention proposes, by way of example, irradiating the support structure 11—in contrast to the structure of the component 10—with altered irradiation parameters. In particular, layers for the support structure 11 can be irradiated with an increased irradiation speed v. At various points of the area vector Vh, the reference sign v indicates an irradiation speed in each case for the corresponding point. It is evident in particular that the irradiation speed for the corresponding area irradiation in the region of the component on the left and also in the region of the transition (in the center) can be v=600 mm/s, by way of example. By contrast, the irradiation speed in the region of the support structure can be increased relative thereto; as illustrated for example v=800 mm/s.

Alternatively or additionally, the support structure 11 can be manufactured in such a way that one or more layers Ln in a layer sequence are omitted only for the support region, but are regularly irradiated for example in the region of the component geometry. In accordance with this embodiment, it can be advantageous that those layers for the build-up of the support structure 11 which are actively irradiated are then irradiated with an adapted, in particular increased, irradiation power p in order to melt the underlying pulverulent layer regions which were omitted from the irradiation. As is known, an increased radiation power or power density also causes a deeper melt pool which extends downward over more than five layer thicknesses, for example, and thus also reaches the loose powder regions. As a result the dimensional stability of the support structure is then ultimately ensured—as it were as a massy solid material.

It goes without saying that further manufacturing parameters or irradiation parameters can be adapted—either in the component region or in the region of the support structure—in the context of this strategy. Said parameters can concern for example the layer thickness L, a melt pool depth, a radiation power introduced, a laser wavelength, a so-called hatching spacing of individual area irradiation vectors, a beam offset, an irradiation speed, a beam focus, an irradiation angle or further parameters, such as, for example, the inert gas used for the irradiation or other ambient conditions, such as an ambient pressure, or the like.

Figure 4:
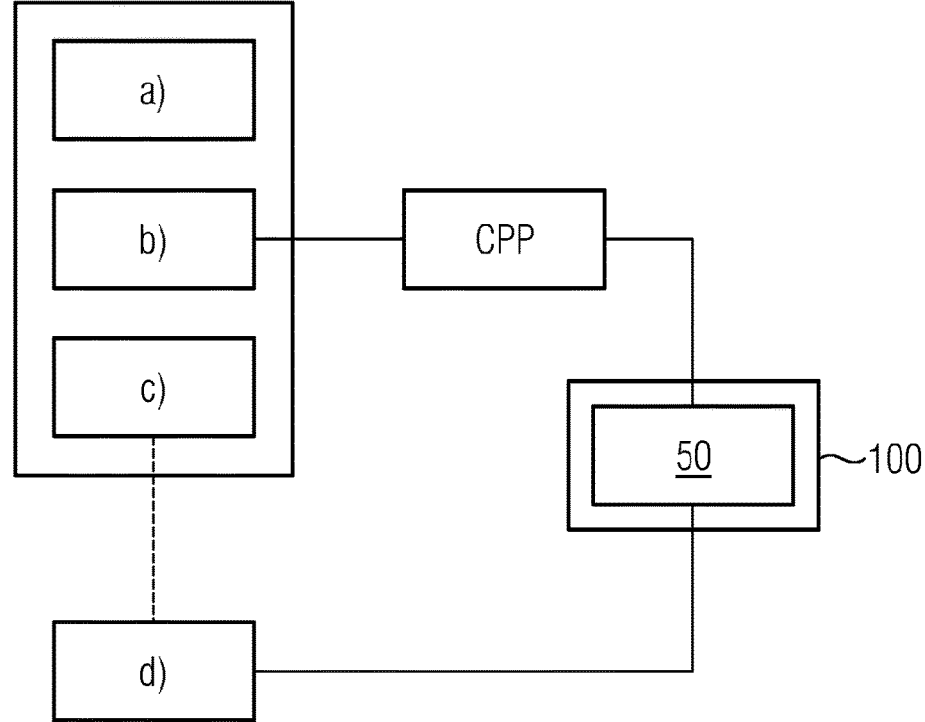
FIG. 4 shows a schematic flow diagram, indicating method steps according to the invention.

FIG. 4 shows a schematic flow diagram indicating and summarizing method steps according to the invention. The method described is a method for manufacturing the support structure described, or the specification of a corresponding irradiation strategy therefor.

The method comprises, a), providing the geometry for the component 10 having the region 10a to be supported.

The method furthermore comprises, b), providing the support structure 11 for the region 10a of the component 10.

The method furthermore comprises, c), defining the irradiation pattern M for the irradiation of the powder layers Ln of a raw material P for the support structure 11, wherein area irradiation vectors Vh for an irradiation for a structure of the component 10 extend into the (lateral) region of the support structure 11. In other words, the aforementioned vectors, as described above, concern common area vectors for the component 10 and for the support structure 11.

The method furthermore comprises, d), selectively irradiating layers Ln for the component 10 and the provided support structure 11 in accordance with the defined irradiation pattern M, as described above.

The invention claimed is:

1. A method for manufacturing a support structure in additive manufacturing of a component, comprising:
    a) providing a geometry for the component having a region to be supported,
    b) providing a support structure for the region of the component to be supported,
    c) defining an irradiation pattern for an irradiation of layers of a raw material for the support structure, wherein area vectors for an irradiation for a structure region of a layer that forms the structure of the component extend into a support structure region of the layer that forms the support structure, wherein common area vectors are defined for structure region of the component and for the support structure region of the component, and
    d) selectively irradiating layers of the raw material for the component and the provided support structure in accordance with the defined irradiation pattern;
    wherein contour vectors are irradiation vectors that are used to define an outer contour of a layer; and wherein an irradiation for the support structure regions of the layers is carried out in a manner free of the contour vectors.

2. The method as claimed in claim 1, wherein the region to be supported or a tangent to the region to be supported forms an angle of less than 40° with respect to a build platform for the additive manufacturing.

3. The method as claimed in claim 1, wherein the support structure that is in contact with the region of the component to be supported is free of lattices or toothings.

4. The method as claimed in claim 1, wherein the support structure is manufactured in such a way that irradiation of one or more support structure regions of layers in a layer sequence is omitted.

5. The method as claimed in claim 4, further comprising:
forming a first layer comprising a first layer structure region and a first layer support structure region;
irradiating the first layer structure region but not the first layer support structure region;
forming a second layer over the first layer, the second layer comprising a second layer structure region and a second layer support structure region;
irradiating the second layer support structure region with an irradiation power that is greater than an irradiation power used to irradiate the second layer structure region and in a manner effective to melt pulverate material in the first layer support structure region thereunder.

6. The method as claimed in claim 1, wherein the support structure regions are irradiated with irradiation parameters that are different than irradiation parameters used when irradiating the structure regions.

7. The method as claimed in claim 1, wherein the support structure regions are irradiated with an irradiation speed that is greater than an irradiation speed used to irradiate the structure regions.

8. The method as claimed in claim 1, wherein the support structure regions are irradiated with an adapted irradiation power.

9. The method as claimed in claim 1, wherein the geometry for the component has overhangs.

10. The method as claimed in claim 1, wherein the additive manufacturing method is a powder-bed-based method, or selective laser melting, or electron beam melting.

11. An apparatus adapted to perform the method of claim 1, comprising:
at least one irradiation device, which is configured to irradiate layers for the component and the support structure in accordance with the irradiation pattern.

12. An apparatus adapted to perform the method of claim 1, comprising:
a controller configured to control an irradiation device for selectively irradiating layers of a raw material in accordance with the irradiation pattern.

13. An apparatus for manufacturing a support structure in the additive manufacturing of a component, the apparatus adapted to perform the method of claim 1, comprising:
    a build platform;
    a coating device for distributing powder layer by layer;
    an irradiation device configured to irradiate layers for the component and the support structure; and
    a controller configured to control the irradiation device for selectively irradiating layers in accordance with the irradiation pattern.

14. The method as claimed in claim 1, wherein the common area vectors comprise vectors that extend transverse to a transition between the structure region and the support structure region.

15. A method for manufacturing a support structure in additive manufacturing of a component, comprising:

a) providing a geometry for the component having a region to be supported, b) providing a support structure for the region of the component to be supported, c) defining an irradiation pattern for an irradiation of layers of a raw material for the support structure, wherein area vectors for an irradiation for a structure region of a layer that forms the structure of the component extend into a support structure region of the layer that forms the support structure, wherein common area vectors are defined for structure region of the component and for the support structure region of the component, and d) selectively irradiating layers of the raw material for the component and the provided support structure in accordance with the defined irradiation pattern;

wherein the support structure is manufactured in such a way that irradiation of one or more support structure regions of layers in a layer sequence is omitted;

the method further comprising:

forming a first layer comprising a first layer structure region and a first layer support structure region;

irradiating the first layer structure region but not the first layer support structure region;

forming a second layer over the first layer, the second layer comprising a second layer structure region and a second layer support structure region; and irradiating the second layer support structure region with an irradiation power that is greater than an irradiation power used to irradiate the second layer structure region and in a manner effective to melt pulverate material in the first layer support structure region thereunder.

* * * * *